(12) United States Patent (10) Patent No.: US 7,996,336 B2
Parida et al. (45) Date of Patent: *Aug. 9, 2011

(54) SYSTEM AND PROGRAM STORAGE DEVICE OF OBJECT CLASSIFICATION UTILIZING OPTIMIZED BOOLEAN EXPRESSIONS

(75) Inventors: Laxmi P. Parida, Mohegan Lake, NY (US); Ajay K. Royyuru, Congers, NY (US)

(73) Assignee: International Business Machines Coroporation, Armonk, NY (US)

( * ) Notice: Subject to any disclaimer, the term of this patent is extended or adjusted under 35 U.S.C. 154(b) by 468 days.

This patent is subject to a terminal disclaimer.

(21) Appl. No.: 12/139,894

(22) Filed: Jun. 16, 2008

(65) Prior Publication Data
US 2008/0250002 A1 Oct. 9, 2008

Related U.S. Application Data

(63) Continuation of application No. 10/676,448, filed on Sep. 30, 2003, now Pat. No. 7,428,515.

(51) Int. Cl.
*G06F 15/18* (2006.01)
(52) U.S. Cl. .......................................................... 706/2
(58) Field of Classification Search .. 706/2; 707/999.02
See application file for complete search history.

(56) References Cited

U.S. PATENT DOCUMENTS

| | | | |
|---|---|---|---|
| 5,519,855 A | 5/1996 | Neeman et al. | |
| 5,652,880 A | 7/1997 | Seagraves | |
| 5,719,692 A | 2/1998 | Cohen | |
| 5,819,255 A | 10/1998 | Celis et al. | |
| 5,878,410 A | 3/1999 | Zbikowski et al. | |
| 6,092,059 A | 7/2000 | Straforini et al. | |
| 6,345,266 B1 | 2/2002 | Ganguly et al. | |
| 6,374,252 B1 | 4/2002 | Althoff et al. | |
| 6,625,615 B2 | 9/2003 | Shi et al. | |
| 6,665,664 B2 | 12/2003 | Paulley et al. | |
| 6,834,286 B2 | 12/2004 | Srinivasan et al. | |
| 6,917,926 B2 * | 7/2005 | Chen et al. | 706/12 |
| 7,096,216 B2 | 8/2006 | Anonsen | |
| 7,120,623 B2 | 10/2006 | Ganesan et al. | |
| 7,162,469 B2 | 1/2007 | Anonsen et al. | |
| 2002/0133502 A1 | 9/2002 | Rosenthal et al. | |
| 2004/0059719 A1 | 3/2004 | Gupta et al. | |

OTHER PUBLICATIONS

Marshall, Roger J., "Classification to Ordinal Categories Using a Search Partition Methodology with an Application in Diabetes Screening", Statistics in Medicine 18, pp. 2723-2735, 1999.
Marshall, Roger J., "A Program to Implement a Search Method for Identification of Clinical Subgroups", Statistics in Medicine, vol. 14, pp. 2645-2659, 1995.
Chang, Chen-Chuan, Garcia-Molina, H., and Paepcke, A., "Boolean Query Mapping Across Heterogeneous Information Sources", Knowledge & Data Engineering, IEEE Transactions on, vol. 8, No. 4, Aug. 1996, pp. 515-521.
Marshall, Roger J., "Generation of Boolean Classification Rules", Proceedings of Computational Statistics 2000, Utretch, Eds JG Bethlehem and PGM van der Heijden, Springer-Verlag.

* cited by examiner

*Primary Examiner* — Jeffrey A Gaffin
*Assistant Examiner* — Mai T Tran
(74) *Attorney, Agent, or Firm* — Ference & Associates LLC

(57) ABSTRACT

Classification of objects using the best boolean expression that represents the most optimal combination of the underlying features is disclosed.

5 Claims, 3 Drawing Sheets

SYSTEM AND PROGRAM STORAGE DEVICE OF OBJECT CLASSIFICATION UTILIZING OPTIMIZED BOOLEAN EXPRESSIONS

CROSS-REFERENCE TO RELATED APPLICATION

This application is a continuation application of U.S. patent application Ser. No. 10/676,448 filed on Sep. 30, 2003, now U.S. Pat. No. 7,428,515, the contents of which are hereby incorporated by reference in its entirety.

FIELD OF THE INVENTION

This invention generally relates to classification of objects and, more specifically, to classification of objects using optimal combinations of underlying features.

BACKGROUND OF THE INVENTION

Modern society creates a sea of data. It can be difficult to understand large data sets using standard data analysis tools. The problem is particularly acute for data sets containing many objects, with many measured properties for each object. The typical approaches of plotting one parameter against another, computing histograms, measuring correlations, and so on are simply insufficient for exploring the data when there are more than a handful of parameters for each object in the sample. Object classification is a very useful tool for data exploration in large, complex problems as it can provide an accurate, understandable characterization of a complex data set.

A classifier takes a set of parameters (or features) that characterize objects (or instances) and uses them to determine the type (or class) of each object. The classic example in astronomy is distinguishing stars from galaxies. For each object, one measures a number of properties (brightness, size, ellipticity, etc.); the classifier then uses these properties to determine whether each object is a star or a galaxy. Classification of objects on the basis of their possession of a diversity of features, however, is a problem of widespread application. Classifiers need not give simple yes/no answers—they can also give an estimate of the probability that an object belongs to each of the candidate classes.

The classification process generally comprises three broad steps. The first is adjustment of input data, the second is classification, and the third is cross-validation. The first step mainly involves noise reduction and/or normalization and is highly domain dependent; it is essential for a proper interpretation of the results. The second step is domain independent. In the third step, the accuracy of the classifier is measured. Knowledge of the accuracy is necessary both in the application of the classifier and also in comparison of different classifiers. Accuracy is typically determined by applying the classifier to an independent training set of objects with known classifications. The advantage of cross-validation is that all objects in the training set get used both as test objects and as training objects. Often steps two and three are carried out repeatedly until a satisfactory classifier has been obtained. Various standard cross validation techniques are known, one of which is five-fold cross-validation.

Generally the computationally hard part of classification is inducing a classifier, i.e., determining the optimal (or at least good) values of whatever parameters the classifier will use. The classification problem becomes very hard when there are many parameters. There are so many different combinations of parameters that techniques based on exhaustive searches of the parameter space are computationally infeasible. Practical methods for classification always involve a heuristic approach intended to find a "good-enough" solution to the optimization problem. There are numerous recognized approaches in the art, including neural networks, neural-neighbor classifiers, axis parallel decision trees, and oblique decision trees. Such approaches are discussed, for example, in Aho, Hopcroft, Ulman "The Design and Analysis of Computer Algorithms", Addison Wesley Publishing Co, 1976. There is, however, need for improvement so as have more accurate classifications.

SUMMARY OF THE INVENTION

In accordance with at least one presently preferred embodiment of the present invention, there is broadly contemplated a system and method classification of objects using optimal combinations of underlying features.

In summary, one aspect of the invention provides a system for classifying objects, the system comprising: an arrangement for formulating a query to identify objects having properties of interest; an arrangement for selecting properties of the objects to compare with object properties included in the query; and an arrangement for determining if based on the selected properties if object belongs in the query.

Another aspect of the invention provides a program storage device readable by machine, tangibly embodying a program of instructions executable by the machine to perform method steps for classifying objects, said method comprising the steps of: identifying properties of objects; formulating a query to identify objects having properties of interest; selecting properties of the objects to compare with object properties included in the query; and determining if based on the selected properties if the object belongs in the query.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

The present invention provides an improved system and method for classifying objects on the basis of their possession of a diversity of features using the best boolean expression that represents the most optimal combination of the underlying features.

Figure 1:
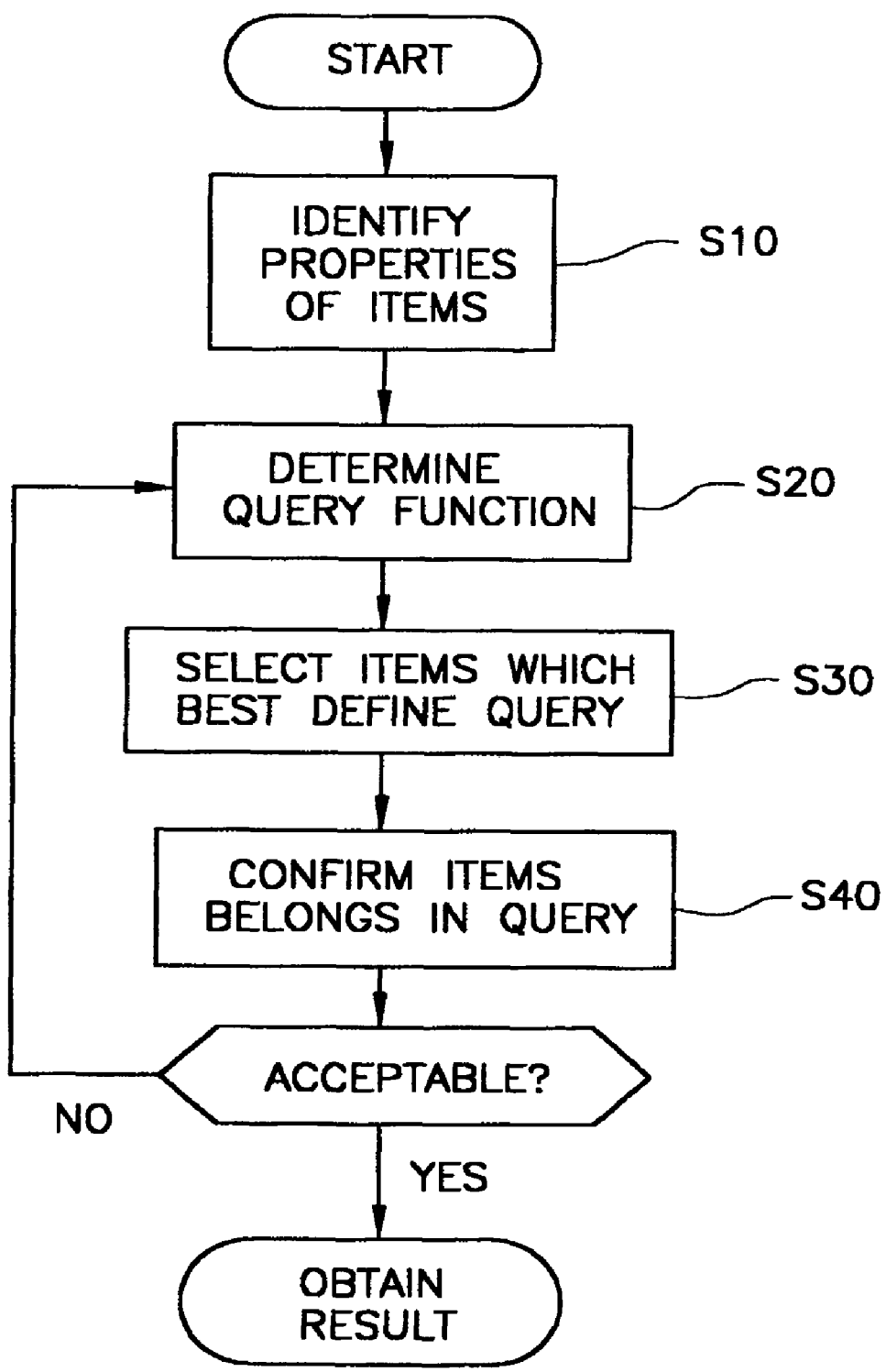
FIG. 1 is a flow chart depicting overview of the method of the present invention.

Referring now to FIG. 1, a flow chart is depicted which generally shows an overview of the method of the present invention. At Step S10, properties of items are identified. At Step S20, the query function is determined, that is, those properties an item returned should possess. At Step S30, those items which best define the query are determined. At Step S40, it is determined whether the item belongs in the query based upon the selected properties. Steps S20 and S30 are generally considered to be the classifier and Step S40 is generally considered to be cross-validation.

Figure 2:
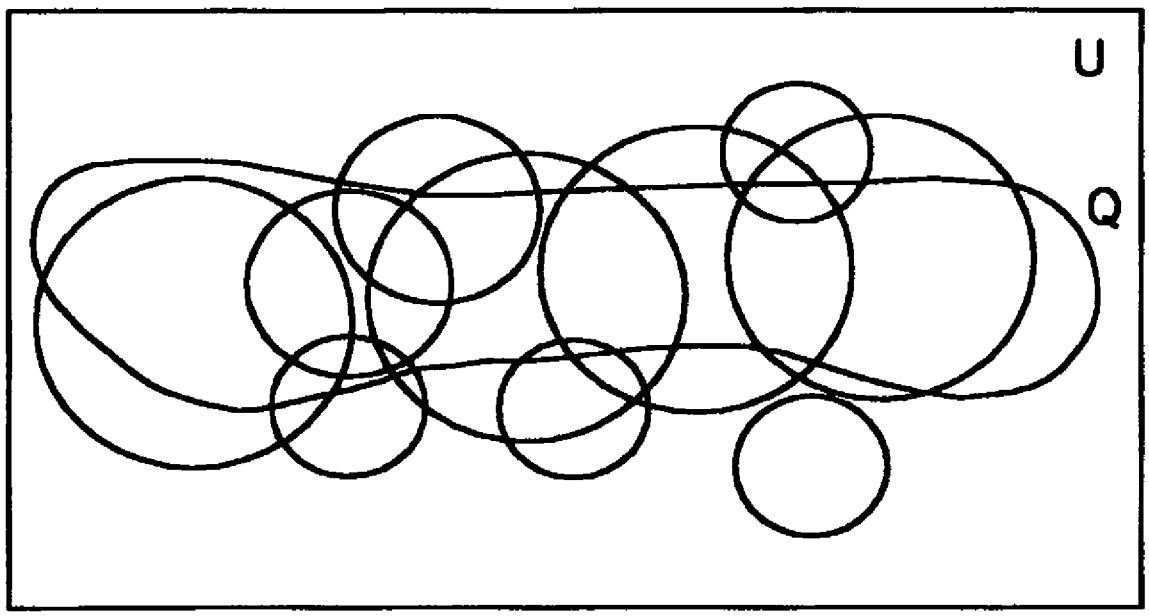
FIG. 2 shows the universal set, query set, and sets.

Referring now to FIG. 2, U is the universal set of all objects, where objects may display zero, one or more features. The collection of objects from U that possesses a specific feature i is referred to as the object set Si with $1 \leq i \leq n$. Q represents a defined collection of objects from U that are known to belong to a particular class or classification bucket. For a given $k \leq n$, the objective is to obtain the best combination of some k features that constitutes the most specific and sensitive signature characteristic of the object collection Q. Usually membership to Q is a non-obvious attribute. For instance, Si(s) are a priori attributes of an event and Q is the a posteriori outcome.

Where $U=\{e_1,e_2,\ldots,e_{n'}\}$ is the universe of n' elements, $S_j \subset U$, $1 \leq j \leq n$ and $Q \subset U$ and $k \leq n$, the task is to find an expression on any k sets $S_j$ that best defines Q. Each set $S_j$ corresponds to a feature $A_j$ defined to have some value $v_{ji}$. There are two issues that need further clarification here: first, what is meant by "expression on the sets", and second, the definition of "best defines" Q. The former gives the form of the output and the latter defines the optimizing function.

Form of the Output: Given a set S that has the value of v of feature A, an expression can be written of the form S(A=v). Just as sets can be combined using union (OR), intersection (AND), complement (NOT) operations so can the corresponding expressions using the $\vee$, $\wedge$, and $\sim$ operations respectively. Let $A^1$ and $A^2$ denote two expressions. Then recall the following:

$$S(A^1 \vee A^2) = S(A^1) \cup S(A^2) \quad\quad 1.$$

$$S(A^1 \wedge A^2) = S(A^1) \cap S(A^2) \quad\quad 2.$$

$$S(\sim A^1) = \tilde{S}(A^1) \quad\quad 3.$$

$$S_1 - S_2 = S_1 \wedge \tilde{S}_2 \quad\quad 4.$$

Thus given any logical expression LE on the expressions, there exists a set corresponding to it given by S(LE).

Optimizing Function: An expression needs to be found that "best" describes Q. To define "best", the following definitions are used. The false and true positives and, the false and true negatives have the usual meaning: however, to establish the notation we define them below:

Definition 1 (false positives, false negatives) Given a set $S \subset U$ and a set $Q \subset U$, the false positives of S with respect to $\overline{Q}$, given as $FP(S,\overline{Q})$ is defined to be $$FP(S,Q) = \{x | x \in S, x \notin Q\}$$

and the false negatives of S with respect to Q, given as FN(S,Q) is defined to be $$FN(S,Q) = \{x | x \notin S, x \in Q\}$$

Definition 2 (true positives, true negatives) Given a set $S \subset U$ and a set $Q \subset U$, the true positives of S with respect to $\overline{Q}$, given as $TP(S,\overline{Q})$ is defined to be $$TP(S,Q) = \{x | x \in S, x \in Q\}$$

and the true negatives of S with respect to Q, given as TN(S,Q) is defined to be $$TN(S,Q) = \{x | x \notin S, x \notin Q\}$$

The errors are the false positives and the false negatives. The "best" fit reduces these errors. However, false positives and false negatives need not have the same relative weight and two constants $\alpha, \beta \geq 0$ are introduced to deal with this. The problem may be formally stated as over all the first order logical expressions or boolean expressions on the features, find the one that optimizes the following function"

$$\min_{LE} \{\alpha|FP(S(LE), Q)| + \beta|FN(S(LE), Q)|\} \quad \alpha, \beta > 0.$$

Attributes: Depending on how two values $v_1$ and $v_2$ of an attribute A can be compared, there may be two kinds of attributes. Let $v_1 \equiv v_2$ imply that the two attribute values are equivalent in the application.

non-numeric: $v_1 \equiv v_2 \Leftrightarrow v_1 = v_2$     1.

numeric: $v_1 \equiv v_2 \Leftrightarrow |v_1 - v_2| \leq \delta$ for some given $\delta \geq 0$.

Numeric attributes give the option of exploiting the complete ordering that exists between the values. Hence an expression with integral v, such as $((v=3) \vee (v=4) \vee (v=5))$ can be written simply as $(3 \leq v \leq 5)$. Also, an expression with real values of v, such as $((v>2.5) \wedge (v<3.2))$ can be written as $(2.5<v<3.2)$.

The disclosure will now turn to a discussion of the algorithm used in the present invention. The algorithm works in the following two steps:

1. The problem is solved exactly for the k=n case (see below). Obtain the optimal cost O.

2. From this optimal configuration, using a greedy algorithm one attribute at a time is dropped to obtain the given k attributes.

(a) Dummy points $x_j \in U$, $1 \leq j \leq n'$ are introduced such that $x_j \in S_i$, $1 \leq i \leq n$ and $x_j \in Q$, $1 \leq j \leq n'$.

(b) At each iteration the attribute $S_i$ that increases the cost by the minimum amount is removed.

The disclosure will now turn to a discussion of solving the k=n case. The algorithm to find the boolean expression (over all possible boolean expressions) of sets proceeds in the two steps set forth below:

1. Partition the union of the S sets U' into K non-overlapping sets $S'_k$ such that $S'_i \cap S'_j = \phi$, for all $i \neq j$. Each $S'_k$ corresponds to a boolean expression on the given sets $S_i$. Clearly, $K \leq n'$.

2. Given the K sets $S'_k$, we wish to obtain an expression on these that minimizes the error. Define the following sets: $C_k = Q \cap S'_k$ and $D_k = S'_k - C_k$. By our definitions $C_k = TP(S'_k, Q)$ and $D_k = TN(S'_k, Q)$. Let $B = Q - \cup_{k \in K} S'_k$. See FIG. 3 for a pictorial depiction of these sets. In this figure Q is the query set and the S' sets are the mutually non-overlapping sets obtained in Step 1. The true positives of each S' is shown as C and the true negatives as D.

$$S'_i \cap S'_j = \phi, \forall i \neq j \quad\quad (1)$$

$$\overline{S}'_i = U' - S_i = \bigcup_{j \neq i} S'_j \quad\quad (2)$$

Using Equation 2, the final expression can have only $S'_i$ terms (and not $\overline{S}'_i$) or vice versa. And using Equation 1, the only meaningful operation is union (and not intersection) of the $S'_i$ terms or vice versa.

Consider an arbitrary expression (union of $S'_i$ terms): $S'_{k_1} \cup \ldots S'_{k_2} \cup \ldots S'_{k_l} = S$. Then clearly, $$FP(S, Q) = \bigcup_{i \in k_1 \ldots k_l} D_i$$

and

-continued $$FN(S,Q) = B \bigcup_{i \in k_1 \ldots k_l} C_i$$

Hence, in this step the optimal value can be obtained simply by traversing through $S'_i$'s and making a local decision which guarantees a global minimum. The algorithm works as follows: Let LE be the boolean expression and O, the cost being minimized.

LE←φ, O←0;
For i=1 ... K
Begin
if $\alpha |D_i| \leq \beta |C_i|$, then LE←LEvS'$_i$, O←O+α|D$_i$|
else O←O+β|C$_i$|
End
O←O+|B|

As discussed above, classification of objects on the basis of their possession of a diversity of features is a problem of widespread application. The present invention may be applied to any number of applications, non-limiting examples of which are set forth in the Appendix hereto. The disclosure will now turn to a discussion of the present invention in a particular application.

Figure 3:
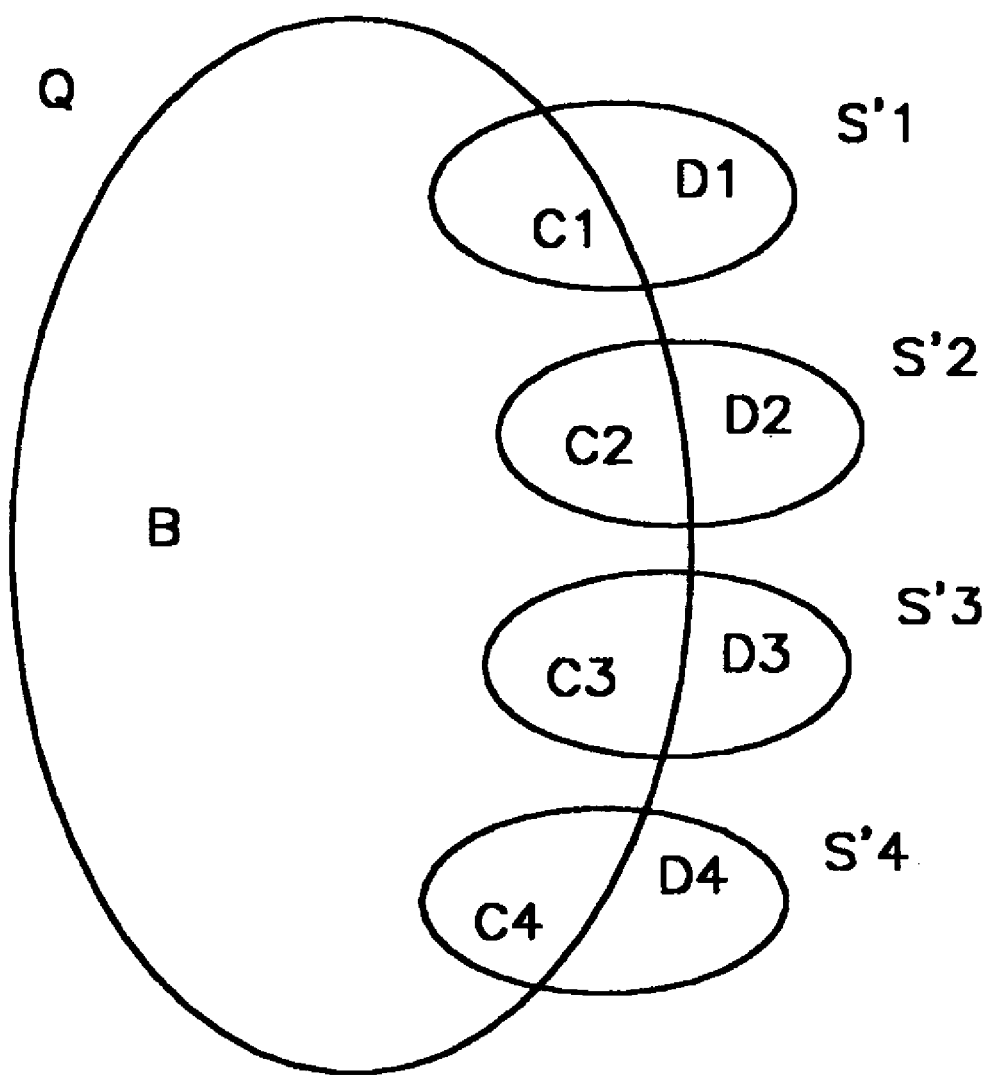
FIG. 3 shows the query set and the result sets in accordance with the invention

The universal set is insurance policies (1 to 11) having three attributes, 1) the policy was made in year 2001 or later, 2) the make of the insured automobile is Toyota, and 3) the insured driver is under the age of 20. The 11 data points have the following attributes:

1) year 2001, not Toyota, driver age above 20
2) year 2001, not Toyota, driver age above 20
3) year 2001, not Toyota, driver age above 20
4) year 2001, Toyota, driver age above 20
5) year 2001, Toyota, driver age above 20
6) year 2001, Toyota, driver age above 20
7) year before 2001, Toyota, driver age above 20
8) year before 2001, Toyota, driver age above 20
9) year before 2001, Toyota, driver age 20 or below
10) year before 2001, Toyota, driver age 20 or below
11) year before 2001, Toyota, driver age 20 or below The set of insurance claims, Q, is Q={2, 3, 5, 6, 8, 10, 11}.
Referring now to FIG. 3:
S'1={1,2,3} year 2001, not Toyota
S'2={4,5,6} year 2001, Toyota
S'3={7,8} Toyota, year before 2001, age above 20
S'4={9,10,11} age 20 or below
C1={2,3} D1={1}
C2={5,6} D2={4}
C3={8} D3={7}
C4={10,11} D4={9}
Assuming α=1 and β=1, the Logical Expression is S'1 v S'2 v S'3 v S'4 with minimum cost 4.

It is to be understood that the present invention, in accordance with at least one presently preferred embodiment, has elements which may be implemented on at least one general-purpose computer running suitable software programs. These elements may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

APPENDIX

1. Protein fold classification using patterns in protein sequences
    U: Protein sequences
    S: Sequence patterns in protein sequences.
    Q: Sequences known to belong to a particular fold (three dimensional arrangement in space of the amino acid chain). Example: sequences known to belong to a particular class/fold/superfamily in SCOP protein classification system. Other fold classification systems like CATH, CE, FSSP, VAST etc could also be used.
        Notes: While it is widely believed that fold is a direct consequence of the sequence, successful prediction of the protein fold from the amino acid sequence remains a grand challenge in biology. Application of the method described here will provide the ability to use sequence patterns in new protein sequences to classify them into known folds.
2. Medical diagnostics using gene expression profile from DNA microarrays
    U: Patients, with and without disease
    S: Expression profile for each gene
    Q: Patients known to have a particular disease (clinical diagnosis).
3. Supermarket purchases
    U: Purchases (a purchase is the contents of the cart)
    S: Each item in the store
    Q: Time of day/location/age group/mode of payment
4. Airline flights
    U: Commercial airline flights
    S: Airline
        Departure city
        Arrival city
        Scheduled time of day/day of week/month/year of departure
        Scheduled time of day/day of week/month/year of arrival
        Crew composition
        Equipment
        Weather at departure/arrival/enroute
        Occupancy
        Scheduled layover from previous flight
        Scheduled flying time
    Q: On time departure
        On time arrival
        Safety incidents
        Customer satisfaction
5. Fast track security check at airports for frequent travelers
    U: Travelling individuals
    S: Flight attributes as in Application 4.
        Individual attributes:
        Age
        Sex
        Height
        Weight
        Name
        Checked in bags
        Carry on bags
        Price of ticket
        Class of travel Mode of payment
Mode of purchase (travel agent/on line/airline)
Advance purchase
Accompanying passengers
Connecting to/from other flights
Q: Found violating security requirements
6. Automobile insurance
   U: Automobile insurance policies
   S: Auto: make, model, year, trim, price paid, color, condition, bought/leased
      Geography: residence zip code, work zip code, commute distance
      Driver: Individual characteristics as in application 5
      Years of driving experience
      Previous accidents—caused, involved (not caused)
      Points in driver's license
      insurance claim history/record
   Q: Makes insurance claim
      collision
      damage
      theft
      personal injury
7. Matchmaking (example: dating service)
   U: Match events, each constituting of a pair of individuals
   S: Individual characteristics
   Q: Satisfactory match
8. Matching of buyer-seller in on-line trading like eBay
   U: Trading events
   S: Individual characteristics
      Traded object characteristics
   Q: Difference between asking and traded price
      Satisfaction with trade
      Satisfaction with traded object
9. Advertisements on Web Portals
   U: web pages
   S: content keywords/indices
      Browser (domain, time of day, comes from)
   Q: likelihood of clicking on particular/class of ad
      viewing the page
10. Protein function classification U: Protein sequences
    S: Sequence patterns or other attributes in protein sequences.
    Q: Sequences known to belong to a particular functional fold.
11. Product Placement
12. Health/personal product selection
    U: patient/consumer, product/service
    S: Genotype/lifestyle of patient/consumer
    Q: Product/service
13. Identification of communication intercepts that constitute security threat
    U: Communication intercepts
    S: keywords, patterns, triggers
       origin, destination of communication
       medium (cell phone/land phone/email/mail)
       time, day, date
    Q: known to constitute security threat
       pertain to some monitored activity (surveillance of known terrorist/drug trafficking networks)
14. Will a new patient respond well to known treatment?
    Design/improve clinical trials by identifying and populating new patients into the non-overlapping set(s) that cause the most error.
    U: Clinical patients
    S: Symptoms
       Individual characteristics (age, sex, location, lifestyle, etc)
    Q: Patients known to respond to a particular treatment
15. Identifying the anonymous/misattributed authors of texts
    U: Complete texts (example books, poetry)
    S: patterns of words (example discovered by pattern discovery)
    Q: Texts known to be by a particular author
       of a particular genre/period
       Example of relevance of this application in http://w3.research.ibm.com/visions/foster/foster.html

What is claimed is:

1. A system for classifying objects using a computer, the system comprising:
   an arrangement for receiving input data corresponding to identified properties of objects to be classified;
   an arrangement for formulating a query to identify objects having properties of interest, wherein the arrangement for formulating a query takes into account:
      properties that best define the query, wherein the properties that best define the query constitute a signature characteristic of an object collection that is known to belong to a particular class of interest, and further wherein the properties constituting a signature characteristic are determined utilizing an expression that best defines the object collection; and
      a desired form of output, wherein the query is manipulated to produce different forms of output based on the desired form of output;
   an arrangement for selecting properties of the objects to compare with object properties included in the query;
   an arrangement for determining if an object belongs in the query based on the selected properties; and
   an arrangement for obtaining a result yielded by the arrangement for determining if the object belongs in the query;
   wherein the system performs object classification utilizing a processor.

2. The system of claim 1, wherein the selection of properties of objects to compare with object properties included in the query is made in conjunction with a determination of a boolean expression of the properties.

3. The system of claim 2, wherein the boolean expression is an optimized expression of the expression that best defines the query.

4. The system of claim 3, wherein the optimization of the boolean expression is accomplished by minimizing the error of the expression which defines the query.

5. A program storage device readable by machine, tangibly embodying a program of instructions executable by the machine to perform computer implemented method steps for classifying objects using a computer, said method comprising the steps of:
   executing computer instructions to identify properties of objects;
   executing computer instructions to input data corresponding to identified properties of objects to be classified;
   executing computer instructions to formulate a query to identify objects having properties of interest, wherein the query takes into account:
      properties that best define the query, wherein the properties that best define the query constitute a signature characteristic of an object collection that is known to belong to a particular class of interest, and further wherein the properties constituting a signature characteristic are determined utilizing an expression that best defines the object collection; and a desired form of output, wherein the query is manipulated to produce different forms of output based on the desired form of output;

executing computer instructions to select properties of the objects to compare with object properties included in the query;

executing computer instructions to determine if the object belongs in the query based on the selected properties; and executing computer instructions to obtain a result yielded by the arrangement for determining if the object belongs in the query.

* * * * *